United States Patent
Morioka et al.

(10) Patent No.: US 8,918,106 B2
(45) Date of Patent: Dec. 23, 2014

(54) RELAY APPARATUS, RADIO COMMUNICATION SYSTEM, AND TRANSMISSION CONTROL METHOD

(75) Inventors: Yasufumi Morioka, Chiyoda-ku (JP); Junichiro Hagiwara, Chiyoda-ku (JP)

(73) Assignee: NTT Docomo, Inc., Tokyo (JP)

( * ) Notice: Subject to any disclaimer, the term of this patent is extended or adjusted under 35 U.S.C. 154(b) by 8 days.

(21) Appl. No.: 13/978,568

(22) PCT Filed: Jul. 2, 2012

(86) PCT No.: PCT/JP2012/066864
§ 371 (c)(1),
(2), (4) Date: Jul. 8, 2013

(87) PCT Pub. No.: WO2013/008660
PCT Pub. Date: Jan. 17, 2013

(65) Prior Publication Data
US 2013/0288687 A1   Oct. 31, 2013

(30) Foreign Application Priority Data

Jul. 8, 2011  (JP) ................................ 2011-151386

(51) Int. Cl.
| | |
|---|---|
| *H04W 72/00* | (2009.01) |
| *H04B 1/38* | (2006.01) |
| *H04W 36/20* | (2009.01) |
| *H04W 36/08* | (2009.01) |
| *H04B 7/155* | (2006.01) |
| *H04B 7/26* | (2006.01) |
| *H04W 84/04* | (2009.01) |

(52) U.S. Cl.
CPC .............. *H04W 36/20* (2013.01); *H04W 36/08* (2013.01); *H04B 7/15542* (2013.01); *H04B 7/2656* (2013.01); *H04W 84/047* (2013.01)
USPC ........................................... 455/437; 455/561

(58) Field of Classification Search
USPC .......... 455/436–448, 450, 560–561, 524–525
See application file for complete search history.

(56) References Cited

U.S. PATENT DOCUMENTS

2010/0087196 A1 * 4/2010 Lee et al. ...................... 455/436
2014/0086138 A1 * 3/2014 Teyeb et al. .................. 370/315

FOREIGN PATENT DOCUMENTS

JP          2011 35783          2/2011

OTHER PUBLICATIONS

3GPP TSG RAN WG1 #58bis, R1-093788"Technology Issues for Heterogeneous Network for LTE-A", Alcatel-Lucent, Alcatel-Lucent Shanghai Bell, pp. 1-5, (Oct. 12-16, 2009).

(Continued)

*Primary Examiner* — Brandon Miller
(74) *Attorney, Agent, or Firm* — Oblon, Spivak, McClelland, Maier & Neustadt, L.L.P.

(57) ABSTRACT

A relay station includes a reception section that receives a first radio frame sent from a base station, and a transmission section that sends a second radio frame that includes a downstream data signal included in the received first radio frame, to a mobile station located in a cell of the relay station. When it is determined that a first identifier of a handover-destination cell, included in a first radio frame, matches a second identifier of the cell of the relay station, included in the second radio frame, and that the transmission timing of the first identifier matches the transmission timing of the second identifier, a time shift section of the relay station shifts the transmission timing of the second radio frame sent from the transmission section so as to make the transmission timing of the first identifier different from the transmission timing of the second identifier.

6 Claims, 9 Drawing Sheets

(56) References Cited

OTHER PUBLICATIONS

3GPP TS 36.300 v10.3.0, 3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), pp. 1-197, (Mar. 2011).

International Search Report Issued Jul. 31, 2012 in PCT/JP12/066864 filed Jul. 2, 2012.

* cited by examiner

| S-SS (GROUP ID) | P-SS (INDIVIDUAL ID) |
|---|---|
| 0 | 0 |
| | 1 |
| | 2 |
| 1 | 0 |
| | 1 |
| | 2 |
| 2 | 0 |
| | 1 |
| | 2 |
| ⋮ | ⋮ |
| 167 | 0 |
| | 1 |
| | 2 |

RELAY APPARATUS, RADIO COMMUNICATION SYSTEM, AND TRANSMISSION CONTROL METHOD

TECHNICAL FIELD

The present invention relates to relay stations, radio communication systems, and transmission control methods.

BACKGROUND ART

In the Third Generation Partnership Project (3GPP), related to standardization of mobile communication systems, a relay station (relay node, RN) for relaying radio communication between a base station (evolved node B, ENodeB) and user equipment (UE) has been stipulated (Non-Patent Document 1). In Non-Patent Document 1, however, the movement of a relay station is not described, and, for example, inter-cell handover at a relay station is not supported.

A mobile relay system has been proposed in which a relay station is installed in a vehicle capable of moving while accommodating a large number of user equipments (for example, a railroad car), and the relay station relays radio communication between the accommodated user equipments and a base station (for example, Patent Document 1). In the mobile relay system, when the relay station moves, a base station (cell) to which the relay station belongs changes. Therefore, handover at the relay station needs to be supported.

CITATION LIST

Patent Document

Patent Document 1: Japanese Patent Application Laid-Open Publication No. 2011-35783

Non-Patent Document

Non-Patent Document 1: 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), 3GPP TS 36.300 V10.3.0 (2011-03), Section 4.7, Support for relaying

SUMMARY OF INVENTION

Technical Problem

When the relay station is fixed, it is possible to set in advance various types of parameters (such as the types of synchronizing signals and the transmission timings of the signals) in order to reduce interference between a downlink signal sent from the base station and a downlink signal sent from the relay station. In the mobile relay system, however, since the base station (cell) to which the relay station is connected changes as the mobile station moves, the synchronizing signal sent from the base station serving as the handover destination of the relay station may accidentally overlap with the synchronizing signal sent from the relay station, reducing the quality of radio communication for user equipments.

In the technology used in Patent Document 1, the synchronizing signal of the handover-source base station and the synchronizing signal of the handover-destination base station are sent at the same time (that is, in the same subframe sequence) to each user equipment when handover takes place at the relay station to cause the user equipment to switch to the synchronizing signal of the handover-destination base station, solving the problem of synchronizing-signal overlapping. However, because handover is required at the user equipment in the technology used in Patent Document 1, the amount of signals (the amount of communication) is increased between the user equipment and the relay station, which may affect the performance of the entire radio communication system.

In view of the above-described problem, an object of the present invention is to provide a relay station capable of reducing an increase in the amount of signals while maintaining the quality of radio communication for user equipments (mobile stations) even when handover takes place at the relay station for the base station as the relay station moves; a radio system therefor; and a transmission control method therefor.

Solution to Problem

A relay station according to the present invention includes a reception section that receives a first radio frame sent from a base station; a transmission section that sends a second radio frame that includes a downstream data signal included in the received first radio frame, to a mobile station located in a cell of the relay station; a detecting section that detects a first identifier included in a first radio frame sent from a base station corresponding to a handover-destination cell and the transmission timing of the first identifier, in a handover process of the relay station from a handover-source cell to the handover-destination cell or after the handover process is completed; a first determination section that determines whether the first identifier matches a second identifier serving as an identifier of the cell of the relay station, the second identifier being included in the second radio frame to be sent to the mobile station; a second determination section that determines whether the transmission timing of the first identifier matches the transmission timing of the second identifier sent from the transmission section; and a time shift section that shifts the transmission timing of the second radio frame sent from the transmission section so as to make the transmission timing of the first identifier different from the transmission timing of the second identifier, when it is determined that the first identifier matches the second identifier and that the transmission timing of the first identifier matches the transmission timing of the second identifier.

In the above-described configuration, at handover of the relay station (specifically, during the handover process or after the handover process is completed), when the first identifier of the cell of the handover-destination base station matches the second identifier of the cell of the relay station, and the transmission timing of the first identifier matches the transmission timing of the second identifier (in other words, when the first identifier collides with the second identifier), the transmission timing of the second radio frame sent from the relay station is shifted, preventing interference between the first identifier and the second identifier. Therefore, the reception quality of the mobile station located in the cell of the relay station is maintained between before and after the handover of the relay station.

It is preferable that a time width by which the transmission timing of the second radio frame is shifted be shorter than a predetermined tolerance time width from when a radio problem (for example, out of synchronization) is detected to when it is determined that a radio link failure occurred.

In the above-described configuration, since the shift width of the transmission timing of the second radio frame is limited to shorter than the time width during which it is determined whether a radio link failure occurs, even when the transmission timing is shifted, it is not determined that a radio link failure occurred. Therefore, the connection between the relay station and the mobile station is maintained, and a connection operation such as a re-connection or a cell search is prevented. Consequently, an increase in the amount of signals is reduced.

It is preferable that the time shift section shift the transmission timing of the second radio frame by inserting at least one non-transmission subframe that does not include the downstream data signal or the second identifier in front of the second radio frame to be sent.

In the above-described configuration, it is possible to prevent the identifiers and the transmission timings of the identifiers from matching each other, with a simple method of inserting a non-transmission subframe.

The first identifier and the second identifier are individual identifiers (unique identities) used for initial synchronization.

In the above-described configuration, it is determined whether the collision prevention operation is required or not according to whether the individual identifiers used for initial synchronization match or do not match. Therefore the signal processing time and load are reduced compared with a configuration in which it is determined whether the collision prevention operation is required or not according to whether all upper-level identifiers (such as physical cell identifiers) that include the individual identifiers match or do not match.

A radio communication system according to the present invention includes at least one mobile station; a plurality of base stations each of which sends a first radio frame; and a relay station that includes a reception section that receives the first radio frame and a transmission section that sends a second radio frame that includes a downstream data signal included in the received first radio frame, to the mobile station located in a cell of the relay station. The relay station includes a detecting section that detects a first identifier included in a first radio frame sent from a base station corresponding to a handover-destination cell and the transmission timing of the first identifier, in a handover process of the relay station from a handover-source cell to the handover-destination cell or after the handover process is completed; a first determination section that determines whether the first identifier matches a second identifier serving as an identifier of the cell of the relay station, the second identifier being included in the second radio frame to be sent to the mobile station; a second determination section that determines whether the transmission timing of the first identifier matches the transmission timing of the second identifier sent from the transmission section; and a time shift section that shifts the transmission timing of the second radio frame sent from the transmission section so as to make the transmission timing of the first identifier different from the transmission timing of the second identifier, when it is determined that the first identifier matches the second identifier and that the transmission timing of the first identifier matches the transmission timing of the second identifier.

A transmission control method according to the present invention is for a relay station provided with a reception section that receives a first radio frame sent from a base station and a transmission section that sends a second radio frame that includes a downstream data signal included in the received first radio frame, to a mobile station located in a cell of the relay station. The transmission control method includes detecting a first identifier included in a first radio frame sent from a base station corresponding to a handover-destination cell and the transmission timing of the first identifier, in a handover process of the relay station from a handover-source cell to the handover-destination cell or after the handover process is completed; determining whether the first identifier matches a second identifier serving as an identifier of the cell of the relay station, the second identifier being included in the second radio frame to be sent to the mobile station; determining whether the transmission timing of the first identifier matches the transmission timing of the second identifier sent from the transmission section; and shifting the transmission timing of the second radio frame sent from the transmission section so as to make the transmission timing of the first identifier different from the transmission timing of the second identifier, when it is determined that the first identifier matches the second identifier and that the transmission timing of the first identifier matches the transmission timing of the second identifier.

DESCRIPTION OF EMBODIMENTS

Figure 1:
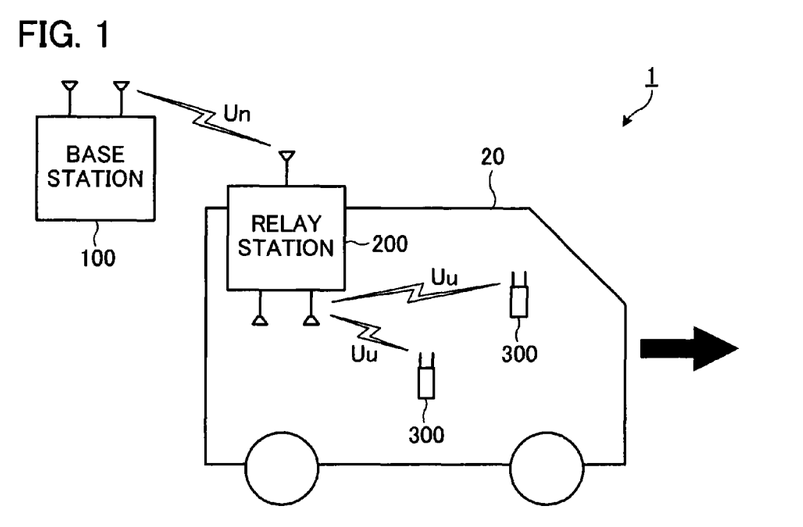
FIG. 1 is a view showing a radio communication system according to an embodiment of the present invention.

FIG. 1 is an outline view showing a radio communication system 1 according to an embodiment of the present invention. The radio communication system 1 includes a base station 100, a relay station 200 installed in a vehicle 20 capable of moving, and user equipments 300 that can be accommodated in the vehicle 20. Communication elements (base station 100, relay station 200, user equipments 300, and the like) in the radio communication system 1 perform radio communication according to a predetermined radio access technology, such as long term evolution (LTE). More specifically, the base station 100, the relay station 200, and the user equipments 300 send and receive radio frames to and from each other to perform radio communication. The vehicle 20 is a bus, a train, a tram, or a public transportation vehicle that can accommodate a plurality of unspecified users, but may be a personal vehicle such as a private car.

In the present embodiment, an example case will be described in which the radio communication system 1 operates according to LTE, but there is no intention to limit the technical scope of the present invention. The present invention can also be applied to other radio access technologies (for example, a public radio LAN or WiMAX) after necessary design changes are made.

The base station 100 is an evolved node B (eNodeB) in an LTE system and can communicate by radio with the relay station 200 and the user equipments 300 located in the cell of the base station 100. In the following description, only a configuration in which the base station 100 has one cell is disclosed, but it is understood as a matter of course that a configuration in which the base station 100 has a plurality of cells (sectors) can be employed.

The user equipment 300 is a UE in the LTE system and can perform radio communicate by using a Uu link set between the user equipment 300 and the base station 100 or between the user equipment 300 and the relay station 200. In other words, the user equipment 300 can belong either to the base station 100 or the relay station 200. The user equipment can be handed over between base stations, between the base station and the relay station, and between relay stations.

The relay station 200 is a relay node (RN) in the LTE system and can relay radio communication between the base station 100 and a user equipment 300 that is located in the cell of the relay station 200. In the same way as the base station 100, the relay station 200 may have a plurality of cells (sectors). A Un link is set between the relay station 200 and the base station 100. It is possible for the relay station 200 to be recognized as a user equipment (UE) from the base station 100 and also to be recognized as a base station (eNodeB) from a user equipment 300. The relay station 200 can be handed over between base stations.

Figure 2:
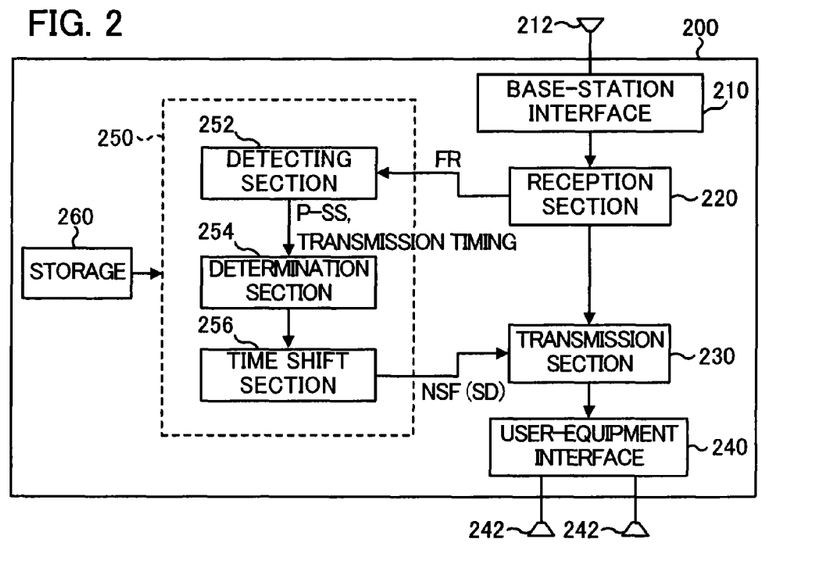
FIG. 2 is a block diagram showing the configuration of a relay station according to the embodiment of the present invention.

FIG. 2 is a block diagram showing the configuration of the relay station 200 according to the embodiment of the present invention. The relay station 200 includes a base-station interface 210, a reception section 220, a transmission section 230, a user-equipment interface 240, a controller 250, and a storage section 260.

The base-station interface 210 includes an antenna 212 for receiving radio waves from the base station 100, and an electrical circuit for converting the received radio waves to an electrical signal (radio frames) and supplying it to the reception section 220. The reception section 220 supplies the radio frames supplied from the base-station interface 210, to the transmission section 230 and the controller 250. The transmission section 230 generates radio frames that include a downstream data signal included in the radio frames supplied from the reception section 220 and supplies them to the user-equipment interface 240, under the control of the controller 250. The user-equipment interface 240 includes an electrical circuit for converting the radio frames supplied from the transmission section 230 to radio waves and antennas 242 for transmitting the radio waves to the user equipment 300. The controller 250 includes a detecting section 252, a determination section 254, and a time shift section 256 as components. The detailed operation of the components in the controller 250 will be described later.

In the following description, the radio frames supplied to the reception section 220 after the radio waves received from the base station 100 are converted by the base-station interface 210 are simply called reception radio frames in some cases, and the radio frames generated by the transmission section 230 and serving as the source of the radio waves to be sent from the user-equipment interface 240 to the user equipment 300 are simply called transmission radio frames in some cases.

The reception section 220, the transmission section 230, and the controller (including the components therein (the detecting section 252, the determination section 254, and the time shift section 256)) are functional blocks implemented when a central processing unit (CPU), not shown, in the relay station 200 executes a computer program and functions according to the computer program. The storage section 260 is a storage medium for storing the computer program and various pieces of information required for transmission control according to the present invention and is, for example, a random access memory (RAM).

Figure 3:
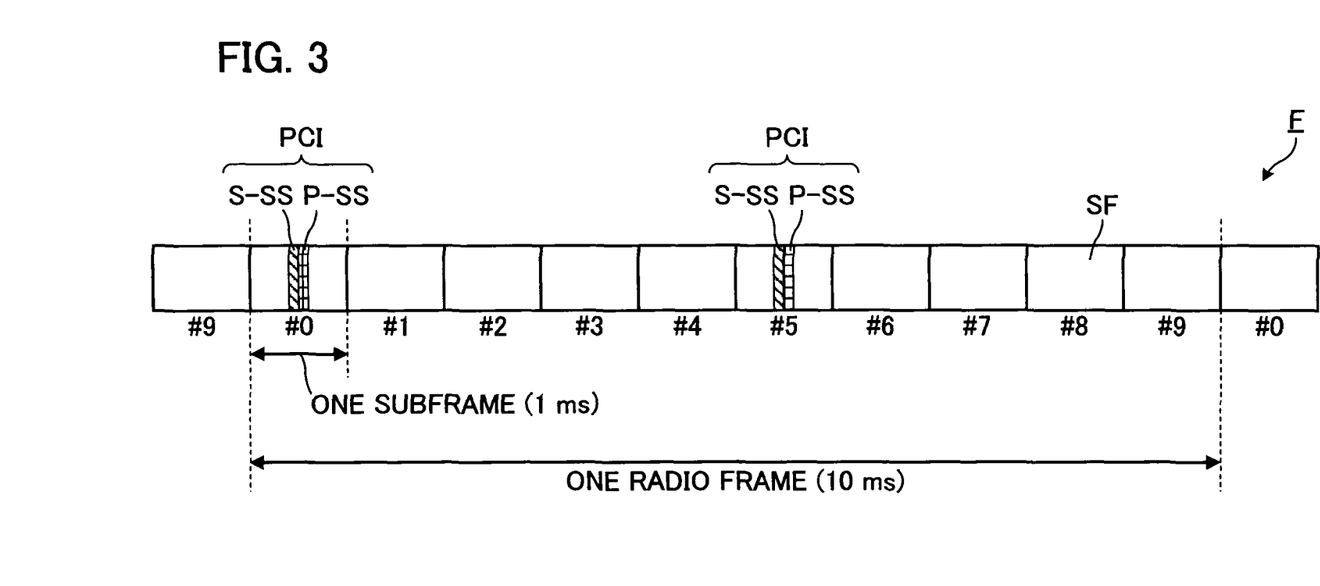
FIG. 3 is a view showing the format of a radio frame used in the radio communication system.

FIG. 3 is a view showing the format of a radio frame F used in the radio communication system 1. One radio frame F includes 10 subframes SF. Each subframe SF includes two slots, not shown, each having a plurality of OFDM symbols. Since each subframe SF has a time length of 1 ms, one radio frame F has a time length of 10 ms. The subframes SF have subframe numbers assigned in the order of transmission, starting from #0 to #9. As shown in the figure, the first and sixth subframes (subframe #0 and subframe #5) include physical cell identifiers (physical cell identities, PCIs) in the radio frame F. A PCI is sent at intervals of five subframes (that is, at intervals of 5 ms).

A PCI is specified for each cell and is used for various types of operations, such as synchronization, channel estimation, and data scrambling (see 3GPP TS 36.211 V10.1.0 (2011-03), Chapter 6.11, Synchronization signals). A PCI includes a primary synchronization signal (P-SS) indicating an individual cell ID (unique cell identity) and a secondary synchronization signal (S-SS) indicating a group cell ID.

Figure 4:
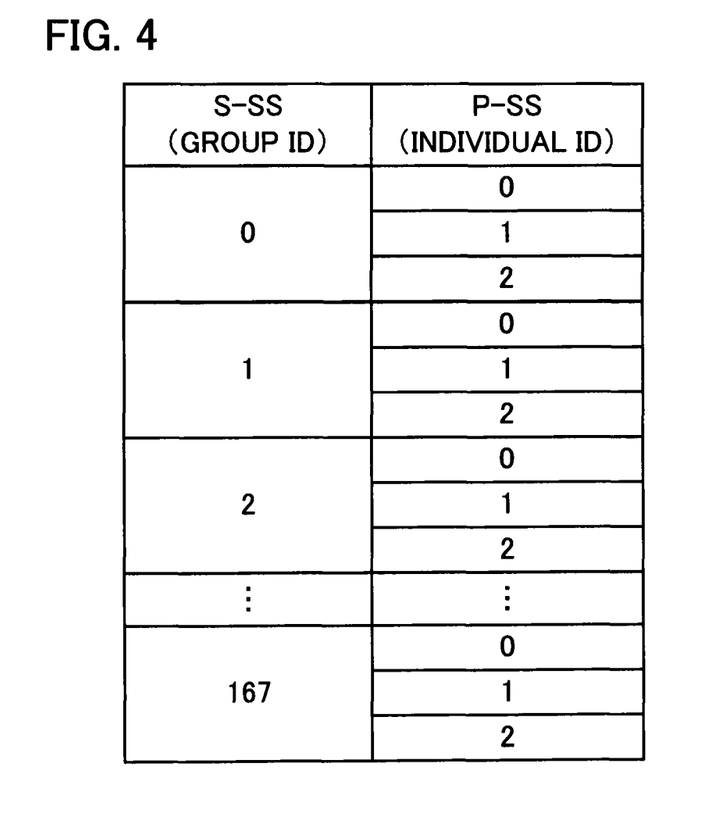
FIG. 4 is a view showing the structure of synchronization signals (P-SS and S-SS) used in the radio communication system.

FIG. 4 is a view showing the structure of P-SSs and S-SSs included in PCIs. There are three P-SSs (individual IDs) and 168 S-SSs (group IDs). As shown in the figure, since three P-SSs correspond to each S-SS, there are 504 (=168×3) PCIs.

An outline of synchronization by using a PCI will be described below. Synchronization has two stages. First, a receiving-side apparatus (for example, a user equipment 300) identifies the P-SS (individual ID) included in the received signal by computing a correlation between the received signal received from a transmission-side apparatus (for example, the base station 100) and replica signals of the P-SSs stored in the receiving-side apparatus, to detect the transmission timing (subframe timing) of the P-SS (primary synchronization). Then, the receiving-side apparatus de-scrambles the received signal (including the S-SS) scrambled with the P-SS and identifies the S-SS (group ID) included in the received signal by computing a correlation between the de-scrambled received signal and replica signals of the S-SSs stored in the receiving-side apparatus, to detect the transmission timing of the radio frame F (secondary synchronization).

Figure 5:
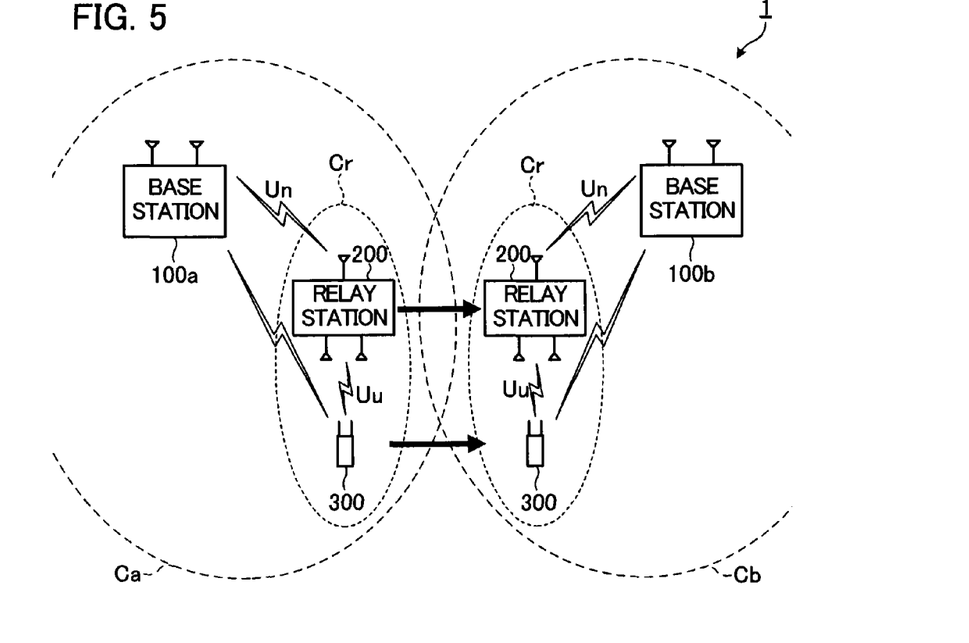
FIG. 5 is a view showing radio communication states when the relay station and user equipment move.

FIG. 5 is a view showing a state of radio communication performed when a relay apparatus 200 and a user equipment 300 move. In FIG. 5, the relay station 200 and the user equipment 300 are first located in a cell Ca of a base station 100a, and then, the relay station 200 and the user equipment 300 move into a cell Cb of a base station 100b as the accommodating vehicle 20 (not shown) moves. The user equipment 300 is located in a cell Cr of the relay station 200 and communicates by radio with the relay station 200 by using the Uu link set between the user equipment 300 and the relay station 200.

In the above case, since the relay station 200 moves from the cell Ca to the cell Cb as the vehicle 20 moves, it is understood that handover from the base station 100a corresponding to the cell Ca to the base station 100b corresponding to the cell Cb is necessary.

The relay station 200 is first connected to the base station 100a corresponding to the handover-source cell Ca by using the Un link, executes handover (Un handover), and then establishes a Un link with the base station 100b corresponding to the handover-destination cell Cb. On the other hand, the Uu link between the relay station 200 and the user equipment 300 is maintained between before and after the Un handover.

After the relay station 200 executes handover, since the user equipment 300 is located in the cell Cr of the relay station 200 and also in the cell Cb of the base station 100b, the user equipment 300 receives radio signals from both the relay station 200 and the base station 100b. Therefore, when the PCIs (in particular, the individual IDs) collide between the cell Cr and the cell Cb, the synchronization performance of the user equipment 300 deteriorates. Specifically, the radio frame sent from the relay station 200 and the radio frame sent from the base station 100b interfere with each other, and it is difficult to distinguish them. Consequently, synchronization becomes difficult in the user equipment 300. This problem will be described below specifically with reference to FIG. 6.

Figure 6:
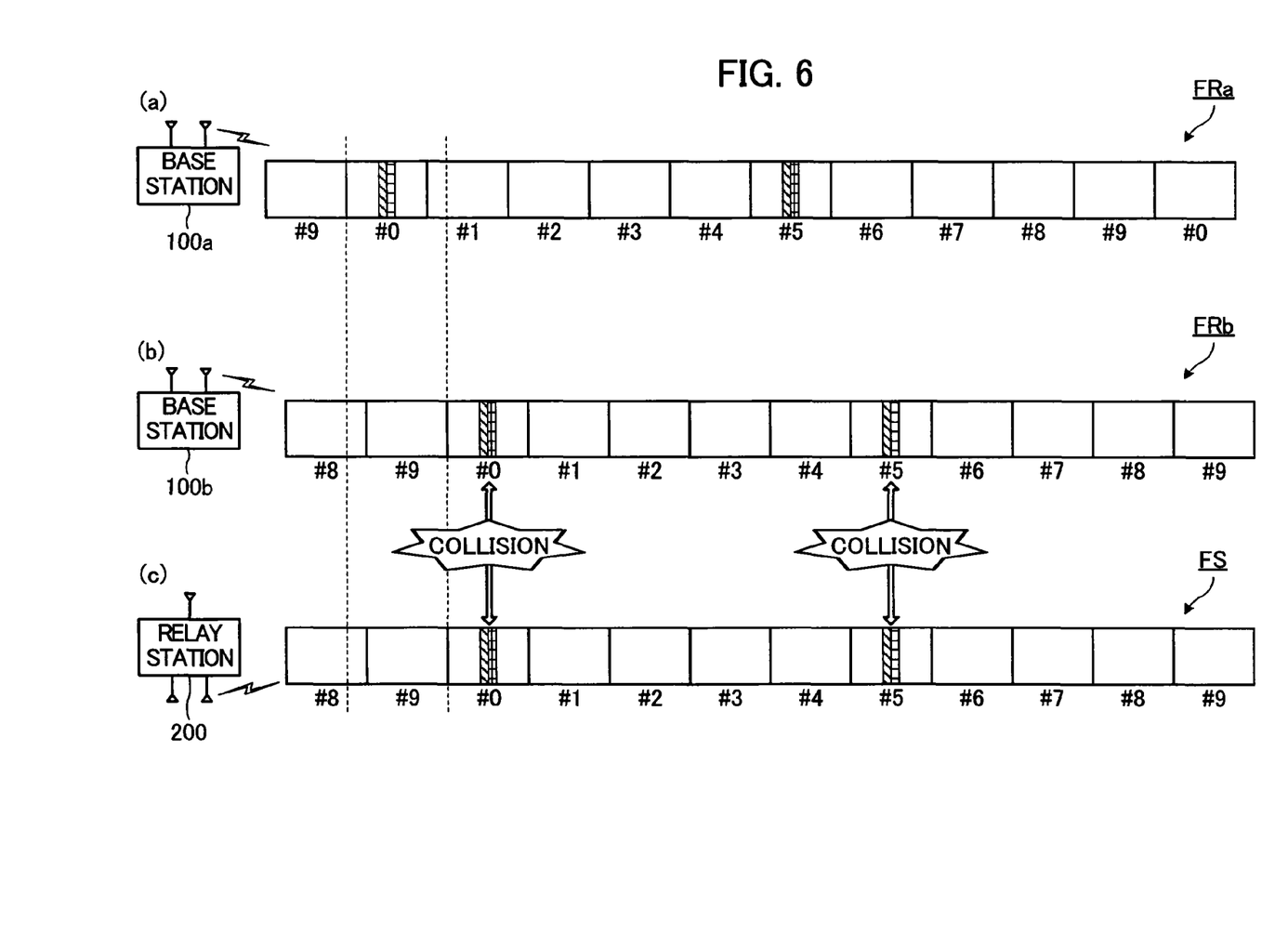
FIG. 6 is a view showing the relationships among the transmission timings of the radio frames.

FIG. 6 is a view showing the relationships among the transmission timings of radio frames F (FRa, FRb, and FS) sent from the handover-source base station 100a, the handover-destination base station 100b, and the relay station 200, respectively.

First, a case in which no PCI collision occurs, that is, the relationship between the reception radio frame FRa from the handover-source base station 100a (hereafter, simply called the reception radio frame FRa in some cases) and the transmission radio frame FS from the relay station 200, will be described. As shown in FIG. 6, since the reception radio frame FRa (FIG. 6(a)) and the transmission radio frame FS (FIG. 6(c)) have different transmission timings (timing at which the radio frame F (subframe SF#0) starts), the timing at which the PCI is sent is different between the reception radio frame FRa and the transmission radio frame FS. Therefore, even when the PCIs (P-SSs and S-SSs) of both frames match, they do not collide with each other.

Next, a case in which PCI collision occurs, that is, the relationship between the reception radio frame FRb from the handover-destination base station 100b (hereafter, simply called the reception radio frame FRb in some cases) and the transmission radio frame FS from the relay station 200, will be described. As shown in FIG. 6, since the reception radio frame FRb (FIG. 6(b)) and the transmission radio frame FS (FIG. 6(c)) have the same transmission timing, the timing at which the PCI is sent is also the same between the reception radio frame FRb and the transmission radio frame FS. In that case, if the PCIs match, they collide with each other.

In summary, PCI collision means that a plurality of PCIs are the same and their transmission timing is also the same. This concept can be applied not only to PCIs but also to P-SSs and S-SSs, which are part of PCIs. For example, a case in which S-SSs do not collide and only P-SSs collide can occur.

When the frame transmission timing is different but the PCI transmission timing is the same between the reception radio frame FRb and the transmission radio frame FS, for example, when the subframe SF#0 of the reception radio frame FRb and the subframe SF#5 of the transmission radio frame FS are sent at the same timing, it is understood as a matter of course that PCI collision occurs.

Since the user equipment 300 identifies a transmission signal (radio frames F) according to the PCI, when PCI collision occurs, it is impossible for the user equipment 300 to distinguish between the reception radio frame FRb from the base station 100b and the transmission radio frame FS from the relay station 200.

Even if the whole PCIs do not collide, when the P-SSs (individual IDs) collide, the following problem occurs. When P-SSs collide, since the PCI transmission timing is the same between the reception radio frame FRb and the transmission radio frame FS, the S-SSs are also sent at the same transmission timing. In addition, since both S-SSs are scrambled with the same P-SS, the scrambled S-SSs are not orthogonal to each other. Therefore, the S-SS of the reception radio frame FRb and the S-SS of the transmission radio frame FS interfere with each other, and the signal quality deteriorates. Consequently, it is difficult to descramble the S-SSs. Even if the S-SS are descrambled, since the transmission timing is the same, the user equipment 300 cannot determine whether the descrambled S-SS was sent from the base station 100b or the relay station 200.

As described earlier, since there are only three types of P-SSs, it is not unlikely that the P-SS of the cell Cr corresponding to the relay station 200 matches the P-SS of the cell Cb (base station 100b) to which handover of the relay station 200 is attempted. In addition, since the relay station 200 can move, it is difficult in principle to always set the P-SS of the relay station 200 (cell Cr) and the P-SS of the handover-destination cell to be different.

In view of the above-described situations, the relay station 200 (controller 250) of the present embodiment determines whether the P-SSs collide in the inter-cell handover process, and if the P-SSs collide, the relay station 200 shifts the transmission timing of the transmission radio frame FS to be sent from the relay station 200 to avoid P-SS collision and also interference between the reception radio frame FRb and the transmission radio frame FS (in particular, interference between the S-SSs).

Figure 7:
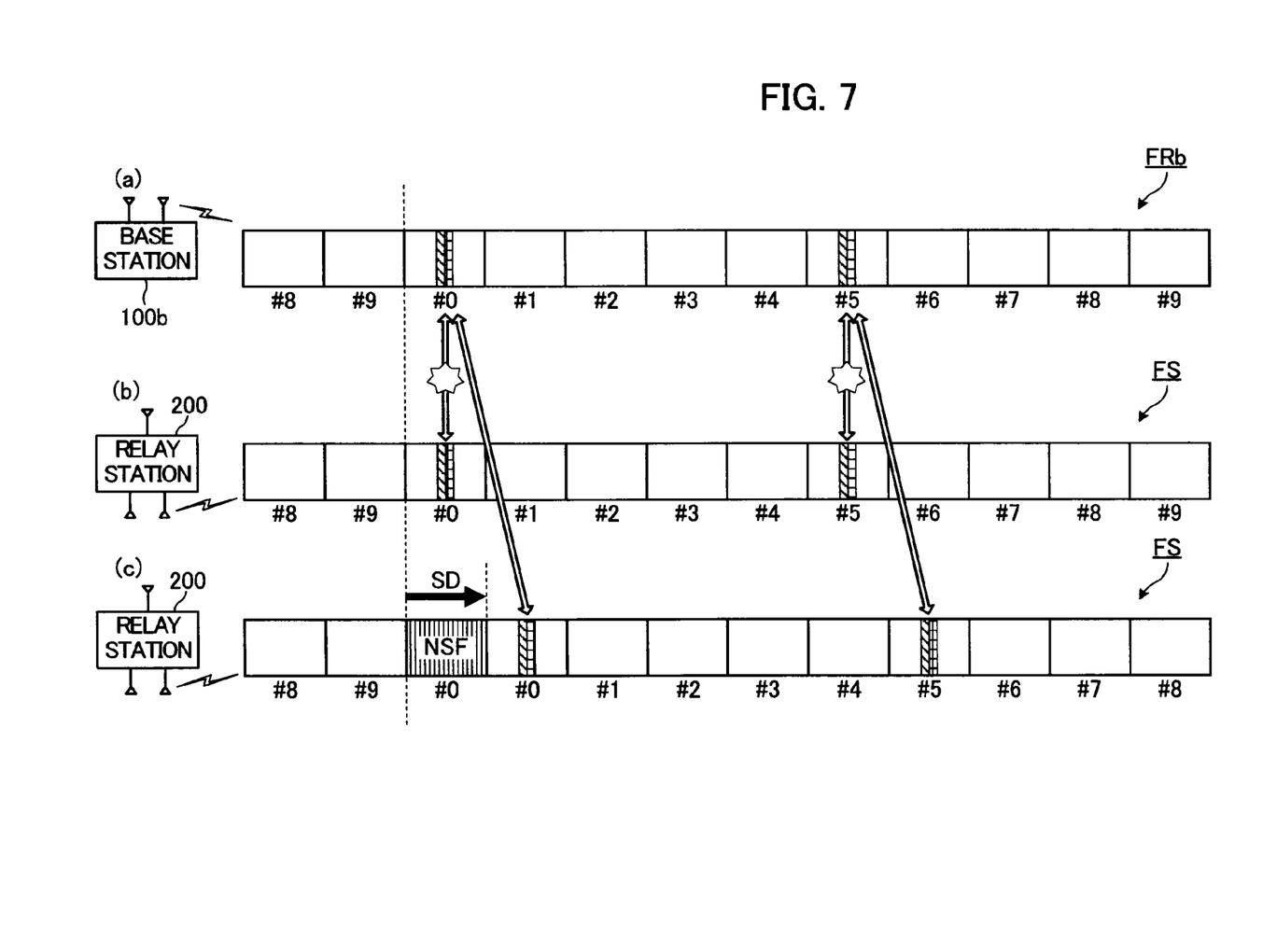
FIG. 7 is a view showing a change in radio frame between before and after the shift of the transmission timing.

FIG. 7 is a view showing a change in the transmission radio frame FS between before and after the transmission timing shift. FIG. 7(a) shows the reception radio frame FRb from the handover-destination base station 100b, FIG. 7(b) shows the transmission radio frame FS before the timing shift, and FIG. 7(c) shows the transmission radio frame FS after the timing shift. FIG. 7(a) and FIG. 7(b) correspond to FIGS. 6(b) and 6(c) (collision).

When the controller 250 of the relay station 200 determines that P-SS collision occurs (determination details will be described later), the controller 250 inserts a non-transmission subframe NFS immediately before the transmission radio frame FS to be transmitted to shift in time the transmission timing of the transmission radio frame FS by a time width SD, as shown in FIG. 7(c). Therefore, the subframe numbers slip backwards in the time-shifted transmission radio frame FS as compared with those in the transmission radio frame FS before the time shift. The non-transmission subframe NSF is a subframe FS that does not include at least a downstream data signal sent from the base station 100b or the PCI of the relay station 200 (cell Cr), and may be a subframe FS that does not send any signal. It is preferable that a subframe number #0 be assigned to a non-transmission subframe NSF for convenience.

A non-transmission subframe NSF may be inserted not only immediately before the transmission radio frame FS but also into the transmission radio frame FS (for example, between the subframe SF#0 and the subframe SF#1). In that case, it is preferable that the same subframe number as that of the subframe SF to be transmitted immediately after the non-transmission subframe NSF be assigned to the non-transmission subframe NSF to be inserted.

Figure 8:
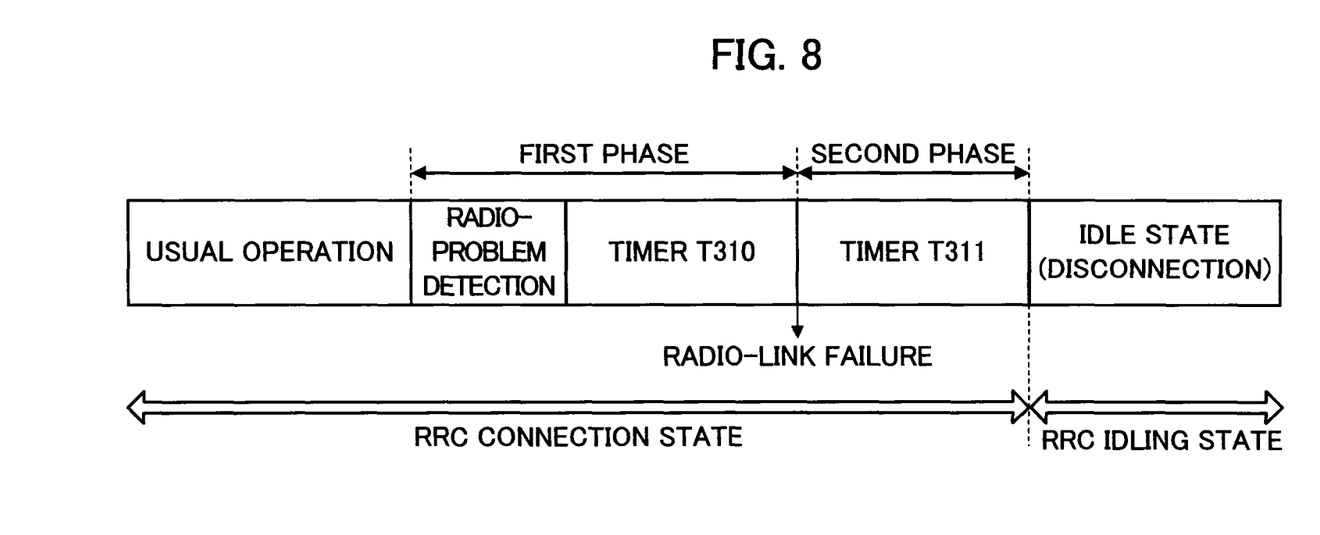
FIG. 8 is a view explaining a radio-link-failure (RLF) detection period in the radio communication system.

FIG. 8 is a view explaining an RLF detection period which can be the tolerance (upper limit) of the shift time width SD (see 3GPP TS 36.300 V10.3.0 (2011-03), Chapter 10.1.6, Radio Link Failure).

If a radio problem occurs during radio communication, step-by-step connection state determination and a connection recovery process are executed. When a terminal-side apparatus detects a radio problem, a timer T310 for counting a predetermined time width D1 is activated. The terminal-side apparatus waits until the timer T310 expires (first phase). If the radio problem is solved during the first phase, the terminal-side apparatus goes back to the usual communication state. If the radio problem is not solved during the first phase and the timer T310 expires, the terminal-side apparatus detects the occurrence of a radio link failure (RLF), and a timer T311 for counting a predetermined time width D2 is activated. The terminal-side apparatus tries to re-connect to the cell to which the apparatus was connected until the timer T311 expires (second phase). If the re-connection succeeds during the second phase, the terminal-side apparatus goes back to the usual communication state. Until the second phase ends, the terminal-side apparatus holds a state in which the connection to the cell to which the apparatus was connected is maintained (that is, an RRC connection state (RRC_CONNECTED)). If the re-connection does not succeed during the second phase and the timer T311 expires, the terminal-side apparatus stops re-connection and proceeds to an idling state (RRC idle state (RRC_IDLE)) (that is, a radio disconnection state).

Until the RLF detection period expires (that is, until the time T310 expires), the terminal-side apparatus does not execute the connection operation (re-connection, cell search, etc.). In other words, the terminal-side apparatus waits while monitoring the detection of the synchronization signals (P-SS and S-SS) that it had received before the radio problem was detected. Therefore, even if a radio problem occurs due to the time shift in the synchronization signals (out of synchronization), when the time shift width is shorter than the time width of the RLF detection period, the synchronization signals can be detected, the radio problem is solved, and the terminal-side apparatus recovers the usual operation before the end of the first phase, that is, before a re-connection operation to the same cell is executed.

In view of these situations, the time width SD by which the transmission radio frame FS is shifted is set to be shorter than the time width of the RLF detection period (timer T310) in the present embodiment. Therefore, the connection operation (re-connection, cell search, etc.) caused by the time shift is avoided, and signaling between the user equipment 300 and the relay station 200 is prevented from taking place.

As described earlier, the time length of one subframe SF (non-transmission subframe NSF) is 1 ms, whereas the setting of the timer T310 is selected from among 0 ms, 50 ms, 100 ms, 200 ms, 500 ms, 1,000 ms, and 2,000 ms. Therefore, unless the timer T310 is set to 0 ms, it is possible to provide the shift time width SD (the period for inserting one or more non-transmission subframes NSF). The setting of the timer T310 may be stored in advance in the storage section 260 of the relay station 200 or may be reported from the base station 100 being connected, as required.

Figure 9:
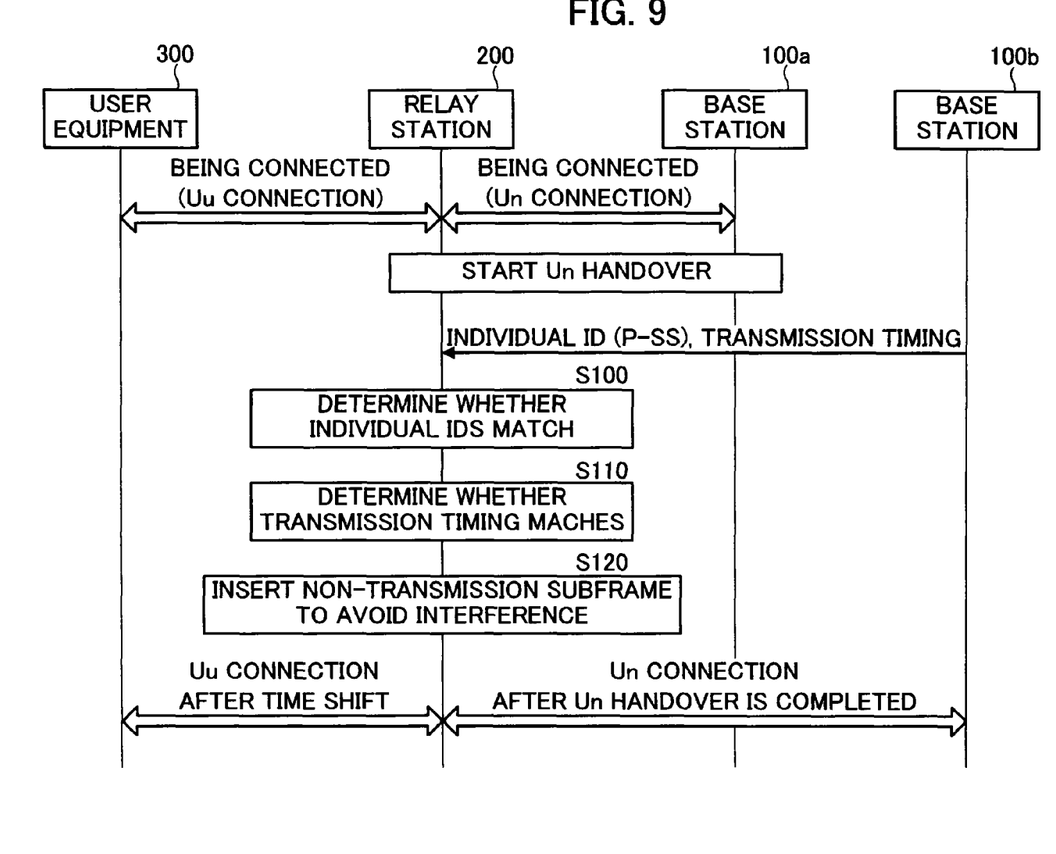
FIG. 9 is a sequence chart of synchronization-signal collision determination and a collision prevention operation in the radio communication system.
Figure 10:
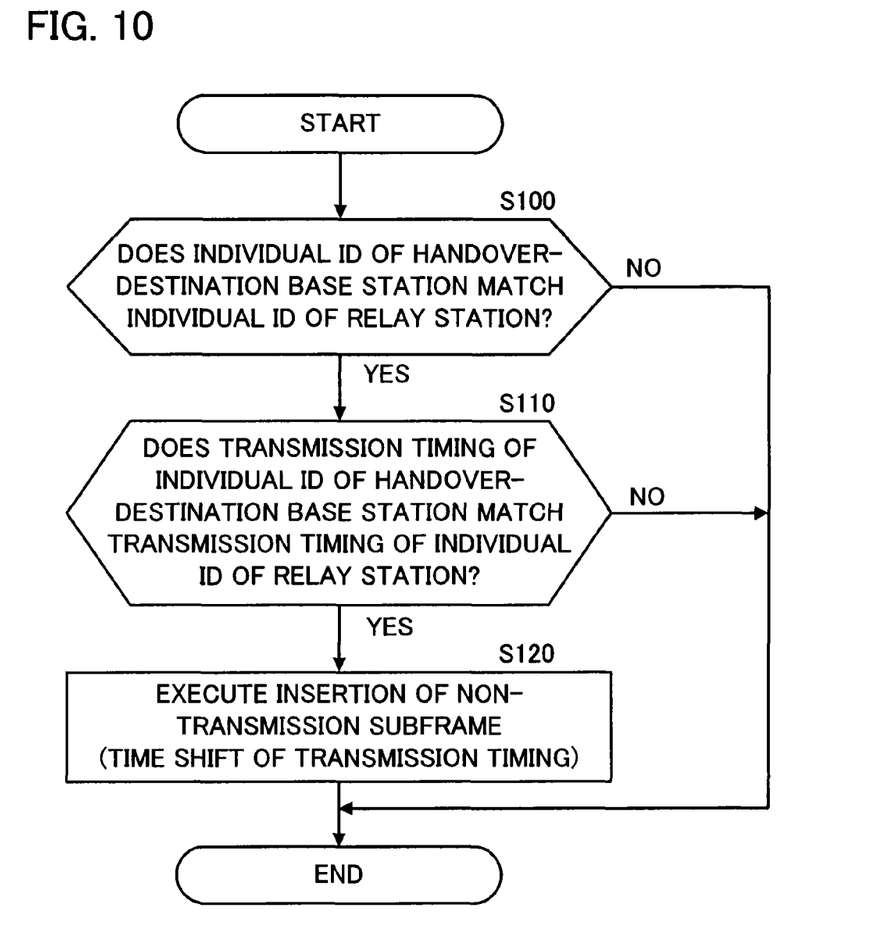
FIG. 10 is a flowchart of the synchronization-signal collision determination and the collision prevention operation in the radio communication system.

Details of synchronization-signal collision determination and a collision prevention operation in the present embodiment will be described with reference to FIG. 9 and FIG. 10. FIG. 9 is a sequence chart of the synchronization-signal collision determination and the collision prevention operation, and FIG. 10 is a flowchart of the synchronization-signal collision determination and the collision prevention operation.

When Un handover starts for the relay station 200 as the vehicle 20 moves, the detecting section 252 of the relay station 200 detects the P-SS included in a reception radio frame FRb sent from the base station 100b corresponding to the handover-destination cell Cb (P-SS of the handover-destination cell Cb) and the transmission timing of the P-SS (subframe timing) and supplies them to the determination section 254.

The determination section 254 determines whether the P-SS of the handover-destination cell Cb matches the P-SS of the cell Cr of the relay station 200, included in the transmission radio frame FS (step S100). The P-SS of the cell Cr of the relay station 200 can be supplied by any method. For example, the P-SS of the cell Cr of the relay station 200 may be stored in the storage section 260 and supplied to the determination section 254 when the determination is performed in step S100, or the P-SS of the cell Cr of the relay station 200 may be acquired from the transmission section 230, which sends the transmission radio frame FS, as required.

When the P-SSs do not match (No in step S100), the collision prevention operation is not executed and the determination ends because P-SS collision will not occur. When the P-SSs match (Yes in step S100), the determination section 254 proceeds to step S120 for further determination.

In step S110, the determination section 254 determines whether the transmission timing of the P-SS of the handover-destination cell Cb matches that of the P-SS of the cell Cr of the relay station 200. The transmission timing of the P-SS of the cell Cr of the relay station 200 can be supplied by any method, like the P-SS of the cell Cr of the relay station 200. Example supply methods are also the same.

When the transmission timings of the P-SSs do not match (No in step S110), the collision prevention operation is not executed and the determination ends because P-SS collision will not occur. When the transmission timings of the P-SSs match (Yes in step S110), the P-SS of the handover-destination cell Cb (base station 100b) collides with the P-SS of the cell Cr of the relay station 200. Therefore, the determination section 254 instructs the time shift section 256 to insert a non-transmission subframe NSF.

Upon receiving the instruction, the time shift section 256 inserts one or more non-transmission subframes NSF immediately before one transmission radio frame FS to be sent from the transmission section 230 so as to make the transmission timing of the P-SS of the handover-destination cell Cb different from the transmission timing of the P-SS of the cell Cr of the relay station 200 (step S120). The insertion of a non-transmission subframe NSF shifts the transmission timing of the transmission radio frame FS. As described earlier, the time width SD, shifted by the time shift section 256 (that is, the number of inserted non-transmission subframes NSF multiplied by one subframe time (1 ms)), is set to be shorter than the time width of the radio-link-failure detection period.

In the embodiment described above, when it is determined that the P-SSs collide, since the transmission radio frame FS is shifted in time (a non-transmission subframe NSF is inserted), interference between the P-SSs and between the S-SSs is prevented while the connection between the relay station 200 and the user equipment 300 is maintained. Therefore, the reception quality of the user equipment 300 located in the cell Cr of the relay station 200 is maintained between before and after the handover of the relay station 200. In addition, since the shift time width SD is set to be shorter than the time width of a radio-access-failure detection period, a radio access failure is prevented, and a re-connection or a cell search between the user equipment 300 and the relay station 200 is prevented, reducing the increase in the amount of signals in the entire system. Furthermore, since the present embodiment avoids PCI collision without changing the PCI (P-SS and S-SS), the system configuration is simplified as compared with a case in which the PCI of the relay station 200 is changed to avoid PCI collision. A handover of the user equipment 300 caused by a change in the PCI of the relay station 200 is also prevented, reducing the increase in the amount of signals in the entire system.

MODIFICATIONS

The embodiment described above can be modified in various ways. Specific example modifications will be described below. Two or more of the following modifications selected in a desired manner can be appropriately combined so long as no mutual contradiction occurs.

Modification 1

In the above-described embodiment, the collision prevention operation is executed when the P-SSs (individual IDs) collide with each other. However, the collision prevention operation may be executed when the PCIs collide with each other. Specifically, a configuration can be employed in which the detecting section 252 of the relay station 200 detects the PCI of the handover-destination cell Cb, the determination section 254 determines whether the PCI of the handover-destination cell Cb matches the PCI of the cell Cr of the relay station 200 (step S100), the determination section 254 determines whether the transmission timings of the PCIs match (step S110), and the collision prevention operation is executed according to the determinations (step S120). When the PCIs match, the P-SSs also match. To determine whether the PCIs match, descrambling of the S-SSs is required, increasing the processing time and the processing load. Therefore, the collision determinations and the collision prevention operation can be executed more quickly and more efficiently in the configuration in which P-SS collision is used for the determinations.

Modification 2

In the above-described embodiment, the collision prevention operation is executed when the transmission timings of the P-SSs (individual IDs) match. Even when the transmission timing of the reception radio frame FRb differs from that of the transmission radio frame FS but the transmission timings of P-SSs match, that is, even when the subframe SF#0 of the reception radio frame FRb and the subframe SF#5 of the transmission radio frame FS are sent at the same timing, the collision prevention operation can be executed. However, the collision prevention operation may be executed simply according to whether the transmission timing of the reception radio frame FRb matches that of the transmission radio frame FS.

Modification 3

In the above-described embodiment, the collision determinations and the collision prevention operation are executed in the process of the Un handover of the relay station 200 from the handover-source cell Ca to the handover-destination cell Cb. However, the collision determinations and the collision prevention operation may be executed after the Un handover is completed.

Modification 4

In the above-described embodiment, the time shift section 256 shifts in time the transmission radio frame FS in units of subframes SF. The time shift may be executed in units of slots or radio frames F (that is, by inserting a non-transmission slot or a non-transmission frame). Further, the time shift may be executed with a desired time width, instead of in units of predetermined transmission lengths, such as subframes. It is preferable, however, that the configuration of the above-described embodiment be used, because PCI (P-SS and S-SS) collision can be prevented with a simple method of inserting a non-transmission subframe NSF (of shifting the subframe numbers).

Modification 5

In the above-described embodiment, the time width SD by which the transmission radio frame FS is shifted is set to be shorter than the time width of the radio-access-failure detection period (the period of duration of the timer T310). However, the time width SD may be set to be longer than the time width of the radio-access-failure detection period. This is because, even with such a configuration, PCI (P-SS and S-SS) collision can be prevented. It is preferable, however, from the viewpoint of maintaining the radio connection between the radio station 200 and the user equipment 300, that the time width SD be set to be shorter than the time width of the radio-access-failure detection period, as in the embodiment.

Modification 6

The functions executed by the CPU in the relay station 200 may be executed by hardware instead of the CPU, or may be executed by a programmable logic device, such as a field programmable gate array (FPGA) or a digital signal processor (DSP).

REFERENCE NUMERALS

1: Radio communication system
100 (100a, 100b): Base stations
20: Vehicle
200: Relay station
210: Base-station interface
212: Antenna
220: Reception section
230: Transmission section
240: User-equipment interface
242: Antennas
250: Controller
252: Detecting section
254: Determination section
256: Time shift section
260: Storage section
300: User equipment
C (Ca, Cb, Cr): Cells
F: Radio frame
FR: Reception radio frame
FS: Transmission radio frame
NSF: Non-transmission radio subframe
SD: Time width
SF: Subframe

The invention claimed is:
1. A relay station comprising:
a reception section that receives a first radio frame sent from a base station;
a transmission section that sends a second radio frame that includes a downstream data signal included in the received first radio frame, to a mobile station located in a cell of the relay station;
a detecting section that detects a first identifier included in a first radio frame sent from a base station corresponding to a handover-destination cell and the transmission timing of the first identifier, in a handover process of the relay station from a handover-source cell to the handover-destination cell or after the handover process is completed;
a first determination section that determines whether the first identifier matches a second identifier serving as an identifier of the cell of the relay station, the second identifier being included in the second radio frame to be sent to the mobile station;
a second determination section that determines whether the transmission timing of the first identifier matches the transmission timing of the second identifier sent from the transmission section; and
a time shift section that shifts the transmission timing of the second radio frame sent from the transmission section so as to make the transmission timing of the first identifier different from the transmission timing of the second identifier, when it is determined that the first identifier matches the second identifier and that the transmission timing of the first identifier matches the transmission timing of the second identifier.

2. The relay station according to claim 1, wherein a time width by which the transmission timing of the second radio frame is shifted is shorter than a predetermined tolerance time width from when a radio problem is detected to when it is determined that a radio link failure occurred.

3. The relay station according to claim 2, wherein the time shift section shifts the transmission timing of the second radio frame by inserting at least one non-transmission subframe that does not include the downstream data signal or the second identifier in front of the second radio frame to be sent.

4. The relay station according to claim 3, wherein the first identifier and the second identifier are individual identifiers used for initial synchronization.

5. A radio communication system comprising:
at least one mobile station;
a plurality of base stations each of which sends a first radio frame; and
a relay station comprising a reception section that receives the first radio frame and a transmission section that sends a second radio frame that includes a downstream data signal included in the received first radio frame, to the mobile station located in a cell of the relay station;
the relay station comprising:
a detecting section that detects a first identifier included in a first radio frame sent from a base station corresponding to a handover-destination cell and the transmission timing of the first identifier, in a handover process of the relay station from a handover-source cell to the handover-destination cell or after the handover process is completed;
a first determination section that determines whether the first identifier matches a second identifier serving as an identifier of the cell of the relay station, the second identifier being included in the second radio frame to be sent to the mobile station;
a second determination section that determines whether the transmission timing of the first identifier matches the transmission timing of the second identifier sent from the transmission section; and
a time shift section that shifts the transmission timing of the second radio frame sent from the transmission section so as to make the transmission timing of the first identifier different from the transmission timing of the second identifier, when it is determined that the first identifier matches the second identifier and that the transmission timing of the first identifier matches the transmission timing of the second identifier.

6. A transmission control method for a relay station provided with a reception section that receives a first radio frame sent from a base station and a transmission section that sends a second radio frame that includes a downstream data signal included in the received first radio frame, to a mobile station located in a cell of the relay station, the transmission control method comprising:
detecting a first identifier included in a first radio frame sent from a base station corresponding to a handover-destination cell and the transmission timing of the first identifier, in a handover process of the relay station from a handover-source cell to the handover-destination cell or after the handover process is completed;
determining whether the first identifier matches a second identifier serving as an identifier of the cell of the relay station, the second identifier being included in the second radio frame to be sent to the mobile station;
determining whether the transmission timing of the first identifier matches the transmission timing of the second identifier sent from the transmission section; and
shifting the transmission timing of the second radio frame sent from the transmission section so as to make the transmission timing of the first identifier different from the transmission timing of the second identifier, when it is determined that the first identifier matches the second identifier and that the transmission timing of the first identifier matches the transmission timing of the second identifier.

* * * * *